(12) United States Patent
Wada

(10) Patent No.: US 7,107,845 B2
(45) Date of Patent: Sep. 19, 2006

(54) EXTENDED ACCURACY VARIABLE CAPACITANCE BRIDGE ACCELEROMETER

(75) Inventor: Joan Denise Wada, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 36 days.

(21) Appl. No.: 10/952,952

(22) Filed: Sep. 29, 2004

(65) Prior Publication Data

US 2006/0065052 A1 Mar. 30, 2006

(51) Int. Cl.
*G01P 15/125* (2006.01)
(52) U.S. Cl. .................................. 73/514.32
(58) Field of Classification Search ............. 73/514.32, 73/514.01; 701/5
See application file for complete search history.

(56) References Cited

U.S. PATENT DOCUMENTS 6,776,043 B1 * 8/2004 Campbell et al. ........ 73/514.32
6,810,739 B1 * 11/2004 Campbell et al. ........ 73/514.01

* cited by examiner

*Primary Examiner*—John E. Chapman
(74) *Attorney, Agent, or Firm*—Ostrager Chong Flaherty & Broitman P.C.

(57) ABSTRACT

A bridge accelerometer system includes four capacitors, wherein two capacitors are formed on each side of a rigid member. The other two capacitors are similarly constructed, except that the rigid member is replaced by a flexured plate. The construction of the plates with respect to the flexured plate is substantially similar to the configuration formed by the rigid member and the other two capacitors, and the fixed capacitors and rigid plate are isolated from the flexured arrangement. The four capacitors are connected to form a bridge generating a bridge voltage signal as a function of a sine wave from a symbol generator. The bridge voltage signal is amplified and converted to digital word in an A/D converter. The digital word is linearized and filtered in a microprocessor, which also includes a precision clock controlling the symbol generator and a conversion clock controlling the A/D converter.

37 Claims, 2 Drawing Sheets

US 7,107,845 B2

EXTENDED ACCURACY VARIABLE CAPACITANCE BRIDGE ACCELEROMETER

CROSS-REFERENCE TO RELATED APPLICATIONS

The present invention is related to application (Application Ser. No. 10/345,529) entitled "Flexure Plate Dual Capacitance Accelerometer," filed on Jan. 16, 2003 and incorporated by reference herein.

TECHNICAL FIELD

The present invention relates generally to accelerometers, and more particularly, to a variable capacitance bridge accelerometer.

BACKGROUND ART

It is well known that capacitive accelerometers measure the acceleration, vibration, and the inclination of objects to which they are attached. These objects typically include missiles, spacecraft, airplanes and automobiles.

In general, capacitive accelerometers change electrical capacitance in response to acceleration forces and vary the output of an energized circuit. Capacitive accelerometer systems generally include sensing elements, such as capacitors, oscillators, and detection circuits.

The sensing elements include at least two parallel plate capacitors functioning in differential modes. The parallel plate capacitors generally operate in sensing circuits and alter the peak voltage generated by oscillators when the attached object undergoes acceleration.

When subject to a fixed or constant acceleration, the capacitance value is also a constant, resulting in a measurement signal proportional to uniform acceleration.

This type of accelerometer can be used in an aerospace system or in a portion of an aircraft or spacecraft navigation or guidance system. Accordingly, the temperature in the operating environment of the accelerometer changes over a wide range. Consequently, acceleration must be measured with a high accuracy over a wide range of temperatures and temperature gradients. This is often a difficult and inefficient process.

The disadvantages associated with current accelerometer systems have made it apparent that a new accelerometer is needed. The new accelerometer should substantially minimize temperature sensing requirements and should also improve acceleration detection accuracy. The present invention is directed to these ends.

SUMMARY OF THE INVENTION

In accordance with one aspect of the present invention, a bridge accelerometer system includes four capacitors, wherein two capacitors are formed on each side of a rigid member. The other two capacitors are similarly constructed, except that the rigid member is replaced by a flexured plate. The construction of the plates with respect to the flexured plate is substantially similar to the configuration formed by the rigid member and the other two capacitors, and the fixed capacitors and rigid plate are isolated from the flexured arrangement. The four capacitors are connected to form a bridge generating a bridge voltage signal as a function of a symbol generator sine wave. The bridge voltage signal is amplified and converted to digital word in an A/D converter. The digital word is linearized and filtered in a microprocessor, which also includes a precision clock controlling the symbol generator and a conversion clock controlling the A/D converter.

One advantage of the present invention is that it generates a dynamic range and granularity sufficient for Inter-Continental Ballistic Missile (ICBM) usage. Moreover, the bridge accelerometer consumes less power than current accelerometers, while dramatically improving reliability.

Another advantage is that it is not substantially affected by changes in temperature or temperature gradients. While the bridge configuration reduces the temperature sensitivity, the symbol generator excitation allows narrow band analog filtering. These effects enhance the signal-to-noise ratio.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE INVENTION

The present invention is illustrated with respect to a bridge accelerometer, particularly suited to the aerospace field. The present invention is, however, applicable to various other uses that may require accelerometers, such as any system requiring position and velocity measurements under extreme conditions, as will be understood by one skilled in the art.

Figure 1:
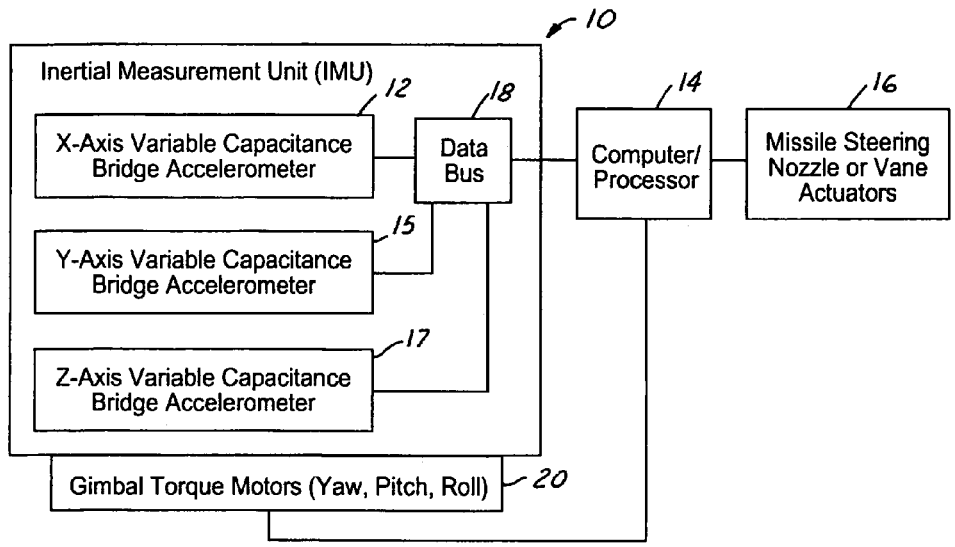
FIG. 1 illustrates an aerospace system including an accelerometer system in accordance with one embodiment of the present invention.
Figure 2:
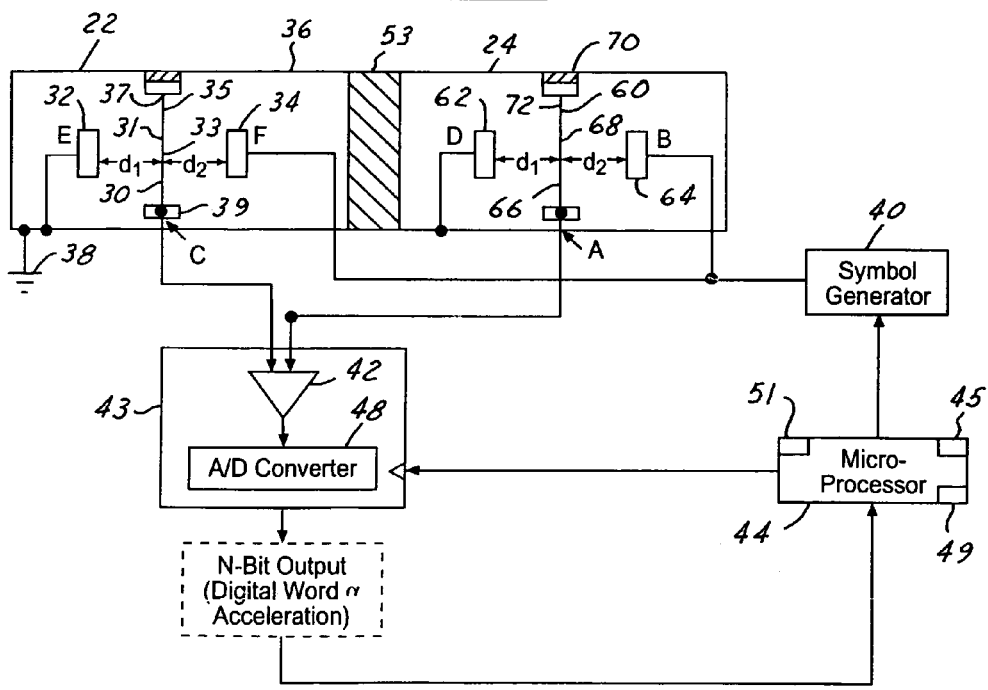
FIG. 2 illustrates an accelerometer system in accordance with FIG. 1.

Referring to FIGS. 1 and 2, the missile or aerospace system 10, including a bridge accelerometer 12 within an inertial measurement unit, is illustrated. The aerospace system 10 is merely an illustrative example of an accelerating object and not meant to be limiting. For example, the present bridge accelerometer 12 could be implemented in any accelerating object to sense acceleration forces, including any type of vehicle or missile system, such as a Minuteman III missile system or a Scud missile system.

The illustrated aerospace system 10 includes an inertial measurement unit 13 including three bridge accelerometers 12, 15, 17 and a data bus 18. The three accelerometers, the x-axis accelerometer 12, the y-axis accelerometer 15, and the z-axis accelerometer 17, are coupled to gimbals and gimbal torque motors 20 (yaw, pitch and roll motors). The accelerometers 12, 15, 17 are also coupled to the bus 18, which transfers information to a computer/processor 14. The computer 14 is coupled to the missile steering nozzle (or vane actuators) unit 16 and the gimbal torque motors 20.

The bridge accelerometer 12 or extended accuracy variable capacitance bridge accelerometer is a single axis accelerometer generating a robust wide dynamic range of performance. Important to note is that alternate embodiments of the present invention have one or more accelerometers, the three illustrated accelerometers 12, 15, 17 are only one example of a possible arrangement of accelerometers, and any number of accelerometers can be utilized.

The accelerometer 12 will be described as an illustrative example of the three accelerometers 12, 15, 17 in this embodiment. The accelerometer 12 is part of the inertial measurement unit 13 and includes a housing 36, a flexured plate section 22, a rigid plate section 24, a ground 38, a symbol generator 40, a differential amplifier 42, a microprocessor 44, a heated structure 53, and an analog-to-digital converter 48.

The housing 36 or metal housing structure encloses four capacitors, which will be discussed later. A gas or vacuum environment is also enclosed therein such that there is no interference with the movement of the flexure plate 30 other than the acceleration of the system 10 along a perpendicular axis.

The flexured plate section 22 includes a single flexure plate 30 and two parallel fixed plates 32, 34. The rigid plate section 24 includes a rigid plate and two fixed plates. The two sections are electrically isolated and enclosed in a metal housing structure 36.

In the present embodiment, the flexure plate 30 is coupled to the housing 36 at only one edge 37. Numerous other attachment points are, however, included, as will be understood by one skilled in the art. The flexure plate includes a first side 31, a second side 33 and a common edge 37.

The flexure plate 30 is positioned between the first and second fixed plates 32, 34 such that the first fixed 32 plate is a first distance ($d_1$) from the first side 31 and the second fixed plate 34 is a second distance ($d_2$) from the second side 33 of the flexure plate 30. The flexure plate 30 is affixed to the metal housing structure 36 through at least a portion 35 of the common edge 37 of the flexure plate 30, which is also coupled to a ground 38.

The flexure plate is rigidly fixed to the metal housing structure 36 through almost any manner known in the art. Resultantly, all the system flexure is generated within the flexure plate 30. This generally increases reliability and robustness of the system 10. This, however, generates a non-linear output from the flexure plate 30, which will be discussed regarding the microprocessor 44.

Figure 3:
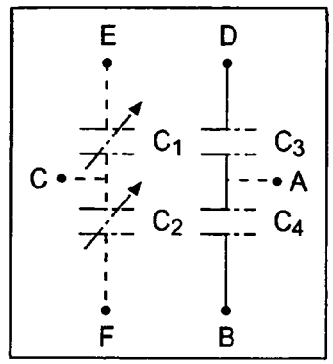
FIG. 3 illustrates the equivalent circuit for the capacitors of FIG. 2.

The combination of the first fixed plate 32 and the flexure plate 30 forms a first parallel plate capacitor, and the combination of the second fixed plate 34 and the flexure plate 30 forms the second parallel plate capacitor. The equivalent capacitor for the first parallel plate capacitor is illustrated in FIG. 3 in broken lines as $C_1$, and the equivalent capacitor for the second parallel plate capacitor is illustrated in broken lines as $C_2$.

The capacitance of the parallel plate capacitors is determined by the following: $C \cong (\epsilon_0 A)/d$, where $\epsilon_0$ is the permittivity constant, A is the area of a fixed plate 32 or 34, and d is the effective distance between the flexure plate 30 and one of the fixed plates 32, 34.

The first fixed plate 32 is coupled to the metal housing structure 36 and positioned a first distance ($d_1$) from the flexure plate 30. The first fixed plate 32 and the flexure plate 30 form a first capacitor whose operation is also governed by the equation $C \cong (\epsilon_0 A)/d$. The first fixed plate 32 responds to movement of the flexure plate 30 when $d_1$ either increases or decreases, thereby generating a first phase shift capacitance signal.

The second fixed plate 34 is also coupled to the metal housing structure 36 and positioned a second distance ($d_2$) from the flexure plate 30. The second fixed plate 34 and the flexure plate 30 form a second capacitor whose operation is governed by the equation $C \cong (\epsilon_0 A)/d$. The second fixed plate 34 responds to movement of the flexure plate 30 when $d_2$ either increases or decreases, thereby generating a second phase shift capacitance signal.

The distances ($d_1$ and $d_2$) between the flexure plate 30 and the fixed plates 32, 34 are a function of acceleration and are proportional or equal when the system 10 is at rest.

During acceleration, the flexure plate 30 flexes according to the reaction force of Newton's second law of motion, force=mass×acceleration (F=ma), causing the distance between the flexure plate 30 and the fixed plates 32, 34 to vary, thus creating the two variable capacitors $C_1$, $C_2$, one on each side of the flexure plate 30.

For the rigid plate section 24, which is insulated from the flexured plate section 22, the rigid plate 60 is positioned between the third fixed plate 62 and fourth fixed plate 64 such that the third fixed plate 62 is a third distance ($d_3$) from a first side 66 and the fourth fixed plate 64 is a fourth distance ($d_4$) from a second side 68 of the rigid plate 60. The rigid plate 60 is coupled to an insulator 70 through at least a portion of at least one common edge 72 of the first side 66 and the second side 68 of the rigid plate 60. The insulator 70 and the third and fourth fixed plates 62, 64 are affixed to the metal housing structure 36.

In the present embodiment, the rigid plate 60 is coupled to the housing 36 through an insulator at only one edge 72. However, numerous other attachment points are included, as will be understood by one skilled in the art.

The combination of the third fixed plate 62 and the rigid plate 60 forms a third parallel plate capacitor, and the combination of the fourth fixed plate 64 and the rigid plate 60 forms the fourth parallel plate capacitor. The equivalent capacitor for the third parallel plate capacitor is illustrated in broken lines in FIG. 3 as $C_3$, and the equivalent capacitor for the fourth parallel plate capacitor is illustrated in broken lines as $C_4$.

The first and second capacitors are formed on each side of the flexure plate 30 and the third and fourth capacitors are formed on either side of the rigid plate 60. The four capacitors are electrically connected to form a bridge. The fixed capacitors (third and fourth) and rigid plate 60 are isolated from the flexured plate 30 and flexured plate capacitors (first and second). All capacitors are designed to be as nearly equal as possible when at rest.

The distance between the flexure plate 30 and the fixed plate 60 is a function of acceleration. The center of each bridge side (A and C in FIGS. 2 and 3) is monitored to detect the differential amplitude. As the flexure plate 30 flexes in response to acceleration, one capacitor increases and the other decreases, thereby increasing the bridge voltage on one side and decreasing bridge voltage on the other.

The bridge is excited through a symbol generator 40 at both the rigid plate section 24 and the flexure plate section 22 and grounded through the ground 38. In the present embodiment, the symbol generator 40 is coupled to the fixed plate 64 and the fixed plate 34. The two capacitive legs (E, D) and (F, B) of the bridge produce two voltage dividers, each of which provides a terminal (A, C), illustrated in FIG. 3, to measure the resulting voltage.

The bridge configuration reduces the temperature sensitivity and the symbol generator excitation allowing narrow band analog filtering, both of which enhance the signal-to-noise ratio. The bridge circuitry utilizes GaAs or high speed CMOS, as the accuracy required for performance will require low propagation delays. In one embodiment, the bridge circuitry is mounted on a heated housing structure 53 including a precision heating device 43 and having sufficient mass to reduce gradients in the bridge in one embodiment.

The voltage phase gives direct indication of the direction of acceleration. This output is gain adjusted if required in the differential amplifier 42. The resulting waveform is then received in an analog-to-digital converter 48 where the data becomes a digital word.

The digital word is then filtered and linearized in the microprocessor 44 for manufacturing and flexure non-uniformities. This output is a digital word having a magnitude proportional to the acceleration of the system in either direction along the perpendicular axis.

The microprocessor 44, which may be a section of the computer 14 or a standalone processor (or ASIC), includes a precision clock 45, which drives the symbol generator 40 to generate a precision sine wave at a known phase angle. The microprocessor 44 also includes a conversion clock 51 for the A/D converter 48 that is coincident with the positive and negative peak of the sine wave. The resulting digital words represent the scaled amplitude without any requirement for filtering, as is needed in the analog domain. Digital filtering may now be applied in the microprocessor 44 to first rectify the results and determine polarity of acceleration; and DC offsets may be eliminated through performing an average of two samples. The digital filtering in the microprocessor 44 then provides the required "n-pole" filtering to reduce any clock jitter and general noise to a required level.

The data is co-added to further reduce the noise, increase accuracy and control the bandwidth response to the required level. All of these functions were previously shared in hardware design.

In other words, the microprocessor 44 receives the overall digital word signal. The microprocessor 44 compensates for both the nonlinear function generated from the analog-to-digital converter 48 and any manufacturing anomalies, as will be understood by one skilled in the art. The microprocessor value is established in manufacturing through taking large samples of performance curves in, for example, a digital corrector 49, as will be understood by one skilled in the art. The accelerometer output is an N-bit digital word having a magnitude proportional to the acceleration of the system 10 in either direction along an axis perpendicular to the flexure plate 30.

This revised bridge configuration reduces system temperature sensitivity and the precision conversion of the symbol generator output removes the requirement for analog processing, thereby allowing greater flexibility in the digital domain. The present circuitry does not require any special development but utilizes newly released commercial off-the-shelf hardware and other previously known hardware. For high level accuracies, the circuitry 40, 42, 44, 48 may be mounted on the heated structure 53.

Statistical filtering of the linearized data somewhere significantly above the maximum flexure frequency also occurs in either the microprocessor 44 or the computer 14 to reduce the overall noise impact on the system 10. The compensation for the non-linearity of the flexure structure and overall transport error is compensated for by the microprocessor 44 (whose values are established in manufacturing through sampling performance curves).

The computer 14 receives the acceleration signal multiplied by the constant and generates a computer signal and response thereto. The computer 14 is embodied as a typical missile or airplane computer, as is familiar in the art.

The missile steering nozzle or vane actuators 16 receive the computer signal and activate the gimbal torque motors 20 or object control devices in response thereto.

Figure 4:
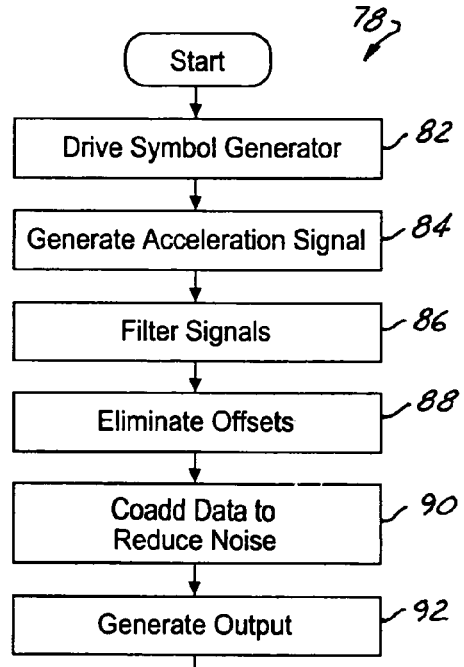
FIG. 4 illustrates a logic flow diagram of accelerometer circuitry in operation.

Referring to FIG. 4, a logic flow diagram 78 of the bridge accelerometer control circuitry is illustrated. Logic starts in the operation block 82 when the microprocessor clock drives the symbol generator to generate a precision sine wave at a known phase angle.

In operation block 84, an acceleration signal is generated from the flexure plate section 22 and the rigid plate section 24 as a function of the precision sine wave.

As described with respect to FIG. 2 above, the bridge output is gain adjusted if required in the differential amplifier 42, and the resulting waveform is received in the analog-to-digital converter 48. The microprocessor conversion clock 51 for the A/D converter 48 is coincident with the positive and negative peak of the sine wave, and a conversion command signal from the clock 51 activates the analog-to-digital conversion. The resulting digital words represent the scaled amplitude without any requirement for filtering as in the analog domain.

In operation block 86, digital filtering is applied in the microprocessor 44 to first rectify the results and determine polarity of acceleration.

In operation block 88, DC offsets are eliminated through performing an average of two samples. The digital filtering in the microprocessor 44 then provides the required "n-pole" filtering to reduce the clock jitter and general noise to a predetermined level.

In operation block 90, the data is co-added to further reduce the noise, increase accuracy and control the bandwidth response to the required level. All of these functions were previously shared in hardware design.

In operation block 92, the accelerometer output is generated as an N-bit digital word having a magnitude proportional to the acceleration of the system 10 in either direction along an axis perpendicular to the flexure plate 30.

Figure 5:
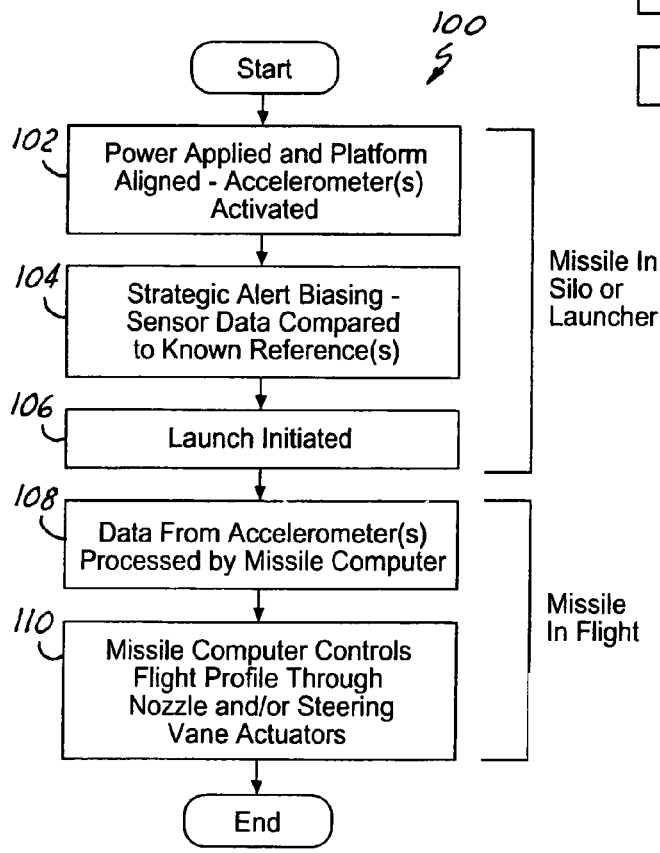
FIG. 5 illustrates a logic flow diagram of the aerospace system of FIG. 1 in operation, in accordance with another embodiment of the present invention.

Referring to FIG. 5, a logic flow diagram 100 illustrating a method for acceleration control is illustrated. Logic starts in operation block 102 where power is applied to the system, the missile platform is aligned and the capacitive accelerometer is activated.

In operation block 104, strategic alert biasing occurs and sensor data is compared to a known reference.

In operation block 106, the missile is launched.

In operation block 108, the missile accelerates and the flexure plate flexes to either increase or decrease $d_1$ or $d_2$ thereby causing the bridge voltage on one side to increase while decreasing on the other side. These voltages are received in the differential amplifier and gain adjusted. The gain adjusted signal is converted to a digital signal and rectified in the microprocessor. Data from the accelerometer(s) is processed by the missile computer or attitude controller.

In operation block 110, missile systems respond to the acceleration. In other words, the computer receives a signal indicating that acceleration of the system has changed. In response to this change, for example, thrusters are activated to compensate for the acceleration change. In other words, the missile computer/controller/processor controls the flight profile through the missile nozzle or steering vane actuators.

In operation, a method for operating a bridge accelerometer system includes accelerating a flexure plate and a rigid plate, generating a bridge waveform from the flexure plate and the rigid plate as a function of a precision sine wave generated at a known phase angle, activating analog to digital conversion of the bridge waveform in response to a signal coincident with a positive and negative peak of the precision sine wave, and converting the bridge waveform signal to a digital word.

From the foregoing, it can be seen that there has been brought to the art a new and improved accelerometer system. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

What is claimed is:

1. An accelerometer system comprising:
   a housing;
   a flexure plate section enclosed within said housing and comprising a first fixed plate, a second fixed plate spaced apart from and in 5 parallel relation to said first plate, and a flexure plate disposed between and in substantially parallel relation to said first and second plates,
   said flexure plate coupled to said housing along at least an edge, said flexure plate and first plate defining a first distance and a first capacitor and said flexure plate and said second plate defining a second distance and a second capacitor, wherein said first and second distances vary in response to acceleration forces acting upon said flexure plate;
   a rigid plate section enclosed within said housing and electrically isolated from said flexure plate section and comprising a third fixed plate, a fourth fixed plate spaced apart from and in parallel relation to said first plate, and a rigid plate disposed between and in substantially parallel relation to said first and second plates,
   said rigid plate electrically isolated from said housing, said rigid plate and said third plate defining a third distance and a third capacitor and said rigid plate and said fourth plate defining a fourth distance and a fourth capacitor, wherein a fifth distance is defined between said rigid plate and said flexure plate such that said fifth distance is a function of said acceleration forces,
   said first capacitor, said second capacitor, said third capacitor and said fourth capacitor connect to form a bridge adapted to generate a bridge voltage signal;
   a symbol generator comprising a precision sine wave generator for generating a precision sine wave at a known phase angle for exciting signals of at least one of said first capacitor, said second capacitor, said third capacitor and said fourth capacitor; and
   a precision clock driving said symbol generator.

2. The system of claim 1 further comprising an A/D converter receiving said bridge voltage signal and converting it to a digital word signal.

3. The system of claim 2, further comprising a conversion clock coincident with the positive and negative peak of said precision sine wave and generating signals for controlling said A/D converter.

4. The system of claim 2 further comprising: a computer adapted to activate at least one of a missile steering nozzle or a vane actuator in response to said linearized signal.

5. The system of claim 1 further comprising a differential amplifier adjusting the amplitude of said bridge voltage signal.

6. The system of claim 5 further comprising a heated structure mounted on said housing, wherein said differential amplifier is mounted on said heated structure.

7. The system of claim 1 further comprising microprocessor adapted to receive said bridge voltage signal and rectify said bridge voltage signal as a function of a said precision sine wave thereby generating a rectified waveform.

8. The system of claim 7, wherein said microprocessor further generates n-pole filtering for reducing clock jitter and general noise.

9. The system of claim 7, wherein said microprocessor further co-adds data to reduce the noise.

10. A system for aerospace use comprising:
    a housing;
    an accelerometer comprising a flexure plate section enclosed within said housing and a rigid plate section enclosed within said housing and electrically isolated from said flexure plate section, wherein a first capacitor, a second capacitor, a third capacitor, and a fourth capacitor are defined within said flexure plate section and said rigid plate section, and wherein a bridge voltage signal is generated from said first capacitor, said second capacitor, said third capacitor, and said fourth capacitor;
    a symbol generator comprising a precision sine wave generator for generating a precision sine wave at a known phase angle for exciting signals of at least one of said first capacitor, said second capacitor, said third capacitor, and said fourth capacitor;
    a precision clock driving said symbol generator;
    an A/D converter receiving said bridge voltage signal and converting it to a digital word signal; and
    a conversion clock coincident with the positive and negative peak of said precision sine wave and generating signals controlling said A/D converter.

11. The system of claim 10 further comprising a computer adapted to activate at least one of a missile steering nozzle or a vane actuator in response to said linearized signal.

12. The system of claim 10 further comprising a differential amplifier adjusting the amplitude of said bridge voltage signal.

13. The system of claim 12 further comprising a heated structure mounted on said housing, wherein said differential amplifier is mounted on said heated structure.

14. The system of claim 12 further comprising microprocessor adapted to receive said bridge voltage signal and rectify said bridge voltage signal as a function of a said precision sine wave thereby generating a rectified waveform.

15. The system of claim 14, wherein said microprocessor further generates n-pole filtering for reducing clock jitter and general noise.

16. The system of claim 14, wherein said microprocessor further co-adds data to reduce the noise.

17. A method for operating an accelerometer system comprising:
    accelerating a flexure plate and a rigid plate;
    generating a bridge waveform from said flexure plate and said rigid plate as a function of a precision sine wave generated at a known phase angle;

activating analog to digital conversion of said bridge waveform in response to a signal coincident with a positive and negative peak of said precision sine wave; and converting said bridge waveform signal to a digital word.

18. The method of claim 17 further comprising adjusting the amplitude of said bridge waveform.

19. The method of claim 17 further comprising linearizing said digital word.

20. The method of claim 17 further comprising activating an object control device in response to said digital word.

21. The method of claim 17 further comprising digitally filtering said digital word to rectify said digital word, thereby determining polarity of acceleration.

22. The method of claim 21, wherein digitally filtering further comprises "n-pole" filtering.

23. The method of claim 21 further comprising a co-adding said digital word.

24. An acceleration detection system including a flexure plate and rigid plate bridge accelerometer comprising:
   a differential amplifier adjusting the amplitude of a bridge signal; an analog-to-digital converter converting said bridge signal to a digital word;
   a symbol generator comprising a precision sine wave generator for generating a precision sine wave at a known phase angle, whereby said bridge signal is generated from the flexure plate and the rigid plate as a function thereof;
   a microprocessor comprising a precision clock for driving said symbol generator, said microprocessor further comprising a conversion clock generating a signal coincident with a positive and negative peak of said precision sine wave for activating said analog-to-digital converter, said microprocessor linearizing said digital word; and
   a computer activating an object control device in response to said 15 digital word.

25. The system of claim 24, wherein said microprocessor further comprises logic digitally filtering said digital word to rectify said digital word, thereby determining polarity of acceleration.

26. The method of claim 25, wherein digitally filtering further comprises "n-pole" filtering.

27. The method of claim 24 further comprising a co-adding said digital word.

28. An accelerometer system comprising:
   a housing;
   a first flexure plate and rigid plate bridge accelerometer coupled to said housing;
   a differential amplifier adjusting an amplitude of a bridge signal from said first flexure plate and rigid plate bridge accelerometer;
   an analog-to-digital converter converting said bridge signal to a first digital word;
   a symbol generator comprising a precision sine wave generator for generating a precision sine wave at a known phase angle, whereby said bridge signal is generated from said first flexure plate 5 and rigid plate accelerometer as a function thereof;
   a microprocessor comprising logic for controlling said symbol generator, said microprocessor further comprising logic activating said analog-to-digital converter in response to a signal coincident with a positive and negative peak of said precision sine wave, said microprocessor further comprises logic digitally filtering said digital word to rectify said digital word, thereby determining polarity of acceleration, said microprocessor linearizing and co-adding said digital word; and
   a computer activating an object control device in response to said first digital word.

29. The method of claim 28, wherein digitally filtering further comprises "n-pole" filtering.

30. The system of claim 28 further comprising: a second accelerometer and a third accelerometer, wherein said second and third accelerometers are arranged with said first flexure plate and rigid plate bridge accelerometer to receive cross axis thrust data.

31. The system of claim 30 further comprising: a data bus adapted to receive acceleration signals from said first, second and third accelerometers, said data bus further adapted to exchange information with said computer.

32. The system of claim 31, wherein said first accelerometer is coupled to a yaw torque motor, said second accelerometer is coupled to a pitch torque motor, and said third accelerometer is coupled to a roll torque motor.

33. The system of claim 30 further comprising a precision heating device coupled to said housing adapted to reduce temperature gradients in said first flexure plate and rigid plate bridge accelerometer.

34. A method for operating an accelerometer system comprising:
   accelerating a first flexure plate and a rigid plate bridge accelerometer;
   generating a bridge waveform from said flexure plate and said rigid plate as a function of a precision sine wave generated at a known phase angle;
   adjusting the amplitude of said bridge waveform;
   activating analog to digital conversion of said bridge waveform in response to a signal coincident with a positive and negative peak of said precision sine wave;
   converting said bridge waveform signal to a first digital word;
   linearizing said first digital word;
   digitally filtering said digital word to rectify said first digital word, thereby determining polarity of acceleration;
   co-adding said digital word; and
   activating an object control device in response to said first digital word.

35. The method of claim 34, wherein digitally filtering further comprises "n-pole" filtering.

36. The method of claim 34 further comprising accelerating a second flexure plate and rigid plate bridge accelerometer and generating a second digital word as a function thereof and accelerating a third flexure plate and rigid plate bridge accelerometer and generating a third digital word as a function thereof.

37. The method of claim 36, wherein activating said object control device further comprises activating said object control device in response to said second digital word and said third digital word.

* * * * *